United States Patent [19]
King

[11] 3,782,702
[45] Jan. 1, 1974

[54] APPARATUS FOR MIXING AND TREATING FLUIDS

[76] Inventor: Robert S. King, 7100 Pampa Pl., Tucson, Ariz. 85704

[22] Filed: Dec. 29, 1969

[21] Appl. No.: 888,787

[52] U.S. Cl. ................................. 261/87, 209/169
[51] Int. Cl. ............................................. B01f 3/04
[58] Field of Search .................. 261/93, 91, 87, 84, 261/28, 29; 259/96, 95, 97; 210/208, 194, 199, 14, 15, 220, 221; 209/168–170

[56] References Cited
UNITED STATES PATENTS

| | | | |
|---|---|---|---|
| 1,242,445 | 10/1917 | Ittner | 261/87 |
| 1,901,123 | 3/1933 | Ruth, Jr. | 209/169 X |
| 1,902,078 | 3/1933 | Jenks | 210/197 X |
| 1,949,696 | 3/1934 | Schoneborn | 259/96 |
| 2,072,944 | 3/1937 | Durdin | 261/91 UX |
| 2,170,496 | 8/1939 | Gard et al. | 261/93 |
| 2,448,590 | 9/1948 | Gunther | 261/87 |
| 2,996,287 | 8/1961 | Audran | 261/87 X |
| 3,252,690 | 5/1966 | Martin | 259/96 X |
| 1,757,197 | 5/1930 | Johnson | 259/96 |
| 3,490,996 | 1/1970 | Kelly, Jr. | 261/87 UX |

FOREIGN PATENTS OR APPLICATIONS

| | | | |
|---|---|---|---|
| 879,861 | 12/1942 | Germany | 209/169 |
| 518,854 | 3/1940 | Great Britain | 259/96 |
| 862,761 | 3/1961 | Great Britain | 210/197 |
| 98,086 | 2/1940 | Sweden | 209/169 |

*Primary Examiner*—Robert Halper
*Attorney*—Lyon and Lyon

[57] ABSTRACT

An apparatus for mixing and treating fluids includes a rotatable hollow shaft having an impeller section which is extended into a first fluid. The impeller section includes a plurality of spiral blades which move and agitate the first fluid and an opening adjacent the blades through which a second fluid in the shaft communicates with the first fluid. The movement of the first fluid creates a suction zone which causes the second fluid to be drawn through the shaft and out the opening.

12 Claims, 6 Drawing Figures

PATENTED JAN 1 1974

INVENTOR
ROBERT S. KING
BY
*Lyon & Lyon*
ATTORNEYS

APPARATUS FOR MIXING AND TREATING FLUIDS

This invention relates to the mixing and treating of fluids and is particularly directed to the distribution of one fluid into another by the use of a rotary member having a novel impeller section which contributes to the efficient mixing and treating of the fluid.

The mixing of two or more fluids can be accomplished in several ways. The most common is to add the two or more masses of fluids to the same vessel and agitate to disperse one or more of the fluids into the other. This method has been effective in the preparation of certain mixtures but other means are usually necessary when the fluids to be mixed have substantially different specific gravities, as in the case when it is desired to mix a gas such as air with a liquid such as water. This is particularly the case when it is desirable to mix and disperse the gas with the liquid at a depth substantially below the surface of the liquid. The mixture or treatment of air and water, generally referred to as aeration, is particularly desirable in the treatment of polluted water or sewage. It has been found that the aeration of the sewage promotes the growth of aerobic bacteria, which in turn converts the waste material to carbon dioxide and biological sludge. Normally, the aeration of sewage is accomplished by spraying the polluted water into the surrounding air. However, this method has proved only partially successful because it effectively produced bacterial action only a few feet below the surface of the polluted water.

Therefore, it is a primary object of this invention to provide a means for rapidly dispersing and mixing at least one fluid into a mass of another fluid which is effective when mixing two fluids having substantially different specific gravities.

Another object of this invention is to mix two fluids having substantially different specific gravities by dispersing the fluid having the lighter specific gravity substantially below the surface of the fluid having the heavier specific gravity.

In accomplishing this and other objects, the invention includes a rotatable member having a hollow shaft and an impeller section. The shaft is adapted to extend into a first fluid and communicate a second fluid from above the surface of the first fluid to an opening adjacent spiral blades on the impeller section. The blades are adapted to move and agitate the first fluid and thereby create a suction zone at the opening into which the second fluid is drawn from the shaft.

Another object of this invention is to provide an apparatus which is non-clogging during the mixing of a fluid containing solids.

A still further object of this invention is to provide a means for dispersing a gas substantially below the surface of a liquid to pressurize the gas.

Other and further objects and advantages of this invention will be made readily apparent from the accompanying drawings and following description.

Figure 1:
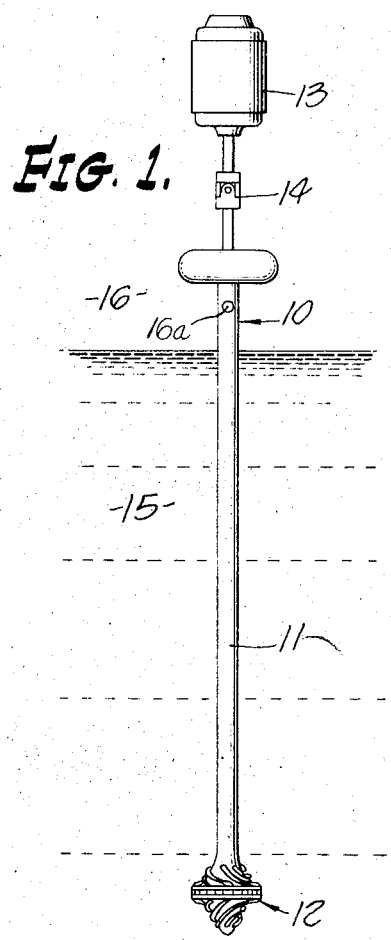
FIG. 1 is a side view of the mixing and dispersing apparatus extended substantially below the surface of a fluid.
Figure 2:
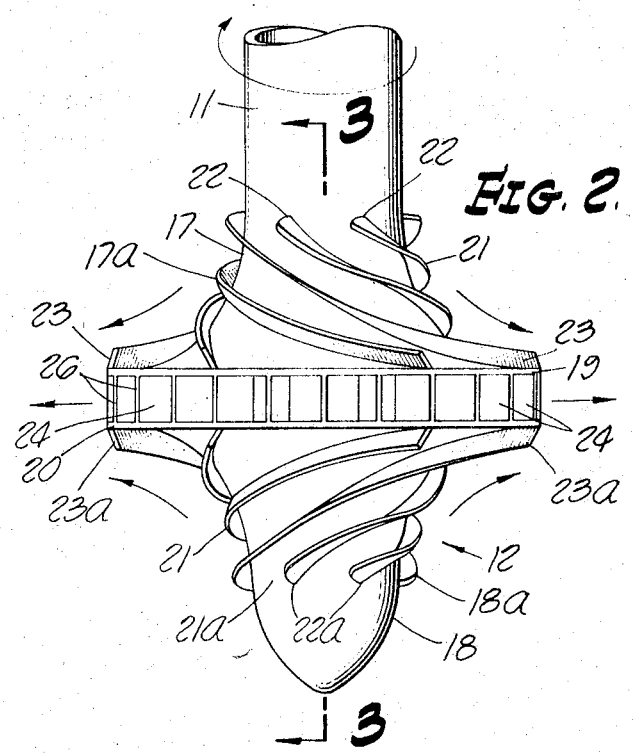
FIG. 2 is a side view illustrating the impeller section.
Figure 3:
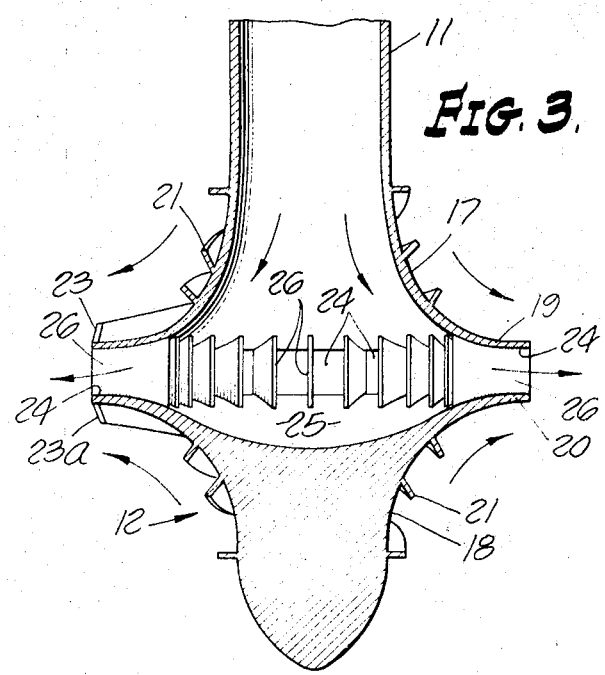
FIG. 3 is a cross-sectional side view of the impeller section taken substantially on the lines 3—3 of FIG. 2.

Referring now in detail to the drawings, the mixing and dispersing apparatus, generally designated 10, as shown in FIG. 1 includes a hollow shaft 11 with an integral impeller section, generally designated 12, at its lower end. A squirrel cage motor 13 adapted to rotate the shaft 11 and impeller section 12 is connected to a universal joint 14 which is in turn connected to the upper end of the shaft 11. The shaft 11, as seen in FIGS. 2 and 3, is hollow and is adapted to extend substantially below the surface of a first fluid 15 from a second fluid 16 above the surface of the first fluid 15. An opening 16a is provided at the upper end of the shaft 11 for communication of the second fluid 16 into the hollow shaft 11. The opening 16a is positioned above the surface of the first fluid 15, but the exact position of the opening 16a and the size thereof may vary. Moreover, it may be desirable in certain instances to provide more than one opening 16a.

The impeller section includes a downwardly extending surface 17 and an upwardly extending surface 18. The downwardly extending surface 17 is curved in cross-section and begins on the shaft 11 parallel to the axis of the shaft and curves downward and outward and terminates in a radially extending flange 19 which in the preferred embodiment is normal to the axis of the shaft 11. The upwardly extending flared surface 18 is curved in cross-section and begins at the lower end of the shaft 11 and curves upward and outward and terminates in the preferred embodiment in a radially extending flange 20, which in the preferred embodiment is normal to the axis of the shaft 11. The surfaces 17 and 18 each include a plurality of continuous spiral screw blades 21 which encircle the curved surfaces 17 and 18. The outer periphery of the blades 21 on the surface 17 defines a flaring surface of revolution 17a. The outer periphery of the blades 21 on the surface 18 defines a flaring surface of revolution 18a. The blades 21 are all of substantially constant thickness and the blades 21 on surface 17 merge at one end 22 with the shaft 11 and terminate at the other end 23 on the flange 19. The blades 21 on surface 18 merge at one end 22a at the hub 21a of the impeller section and terminate at the other end 23a on the flange 20. Moreover, as illustrated in FIGS. 2 through 5, the blades 21 as they extend from the ends 22 and 22a are inclined with respect to the axis of the shaft 11.

A circumferential outlet or opening 24 positioned adjacent the radially outmost extension of the ends 23 and 23a of the blades 21 and between the surfaces of revolution 17a and 18a is provided for communication of the second fluid 16 in the hollow shaft with the first fluid 15. Within the interior chamber 25 of the impeller section 12 are spaced vanes 26 which extend radially inward normal to the axis of the shaft 11 from the outlet 24. The vanes 26 direct the second fluid 16 from within the shaft 11 and assist in distributing the second fluid 16 in the first fluid 15.

In operation the shaft 11 and impeller section 12 are rotated by the motor 13 opposite the direction which the blades 21 encircle the surfaces 17 and 18 when beginning at the ends 22 and 22a. The rotation of the impeller section 12 causes the blades 21 to move the first fluid 15 along two continuous generally vertical paths above and below the opening 24 downward along the shaft and the surface 17 and axially upward along the surface 18 and then radially outward as indicated by the directional arrows in FIGS. 2 and 3. It should be noted that the first fluid 15 is moved by the blades 21 in a clockwise direction along one path and in a counter-clockwise direction along the other path. The movement of the first fluid 15 creates a vacuum or suction zone between the two paths of movement and immediately opposite the circumferential opening 24 and the vacuum zone causes the second fluid 16 to be drawn through the hollow shaft 11 and out the circumferential opening 24 between the vanes 26 into the first fluid 15.

Figure 4:
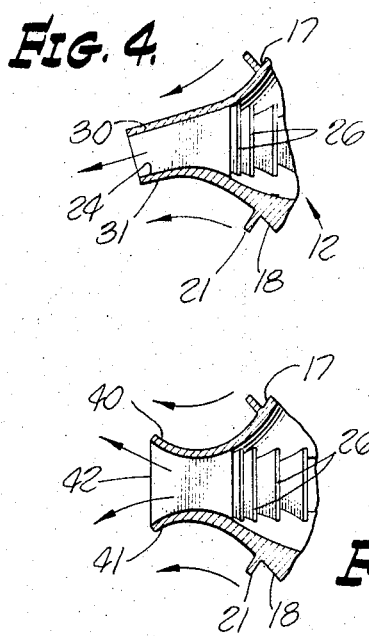
FIG. 4 is a fragmentary view illustrating an alternative embodiment of the impeller section.

In the alternate embodiment shown in FIG. 4 the impeller section 12 is identical except the flange 30. on the surface 17 extends radially outward and is inclined downwardly on an incline which is complimentary to the incline of the flange 31 on the surface 18. This embodiment is adapted to direct the second fluid 16 radially outward and downward into the first fluid 15 as shown by the directional arrows in FIG. 4.

Figure 5:
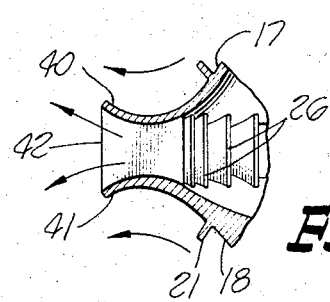
FIG. 5 is a fragmentary view illustrating another alternative embodiment of the impeller section.

In the alternate embodiment shown in FIG. 5 the impeller section 12 is identical except the flanges 40 and 41 on the surfaces 17 and 18, respectively, are flared to increase the size of the circumferential opening 42 and thereby increase the amount of the flow of the second fluid 16 into the first fluid 15.

Other modifications within the scope of the invention which although not shown, should be evident from the discussion of the invention. One of these modifications includes an impeller section 12 having only an upper surface 17a with a flat horizontal surface below the circumferential opening 24 instead of the curved surface 18 with the blades 21. In this modification substantially only the fluid 15 above the opening 24 is moved radially outward adjacent the opening 24. Another modification includes an impeller section having only a lower surface of revolution 18 with the shaft 11 terminating above the circumferential opening onto a flat horizontal surface which extends radially outward from the shaft 11. In this modification substantially only the fluid 15 below the circumferential opening is moved radially outward adjacent the opening 24. It should be further evident that these latter two modifications can be further modified by changing the flanges adjacent the opening 24 in the manner shown in FIGS. 4 and 5.

Figure 6:
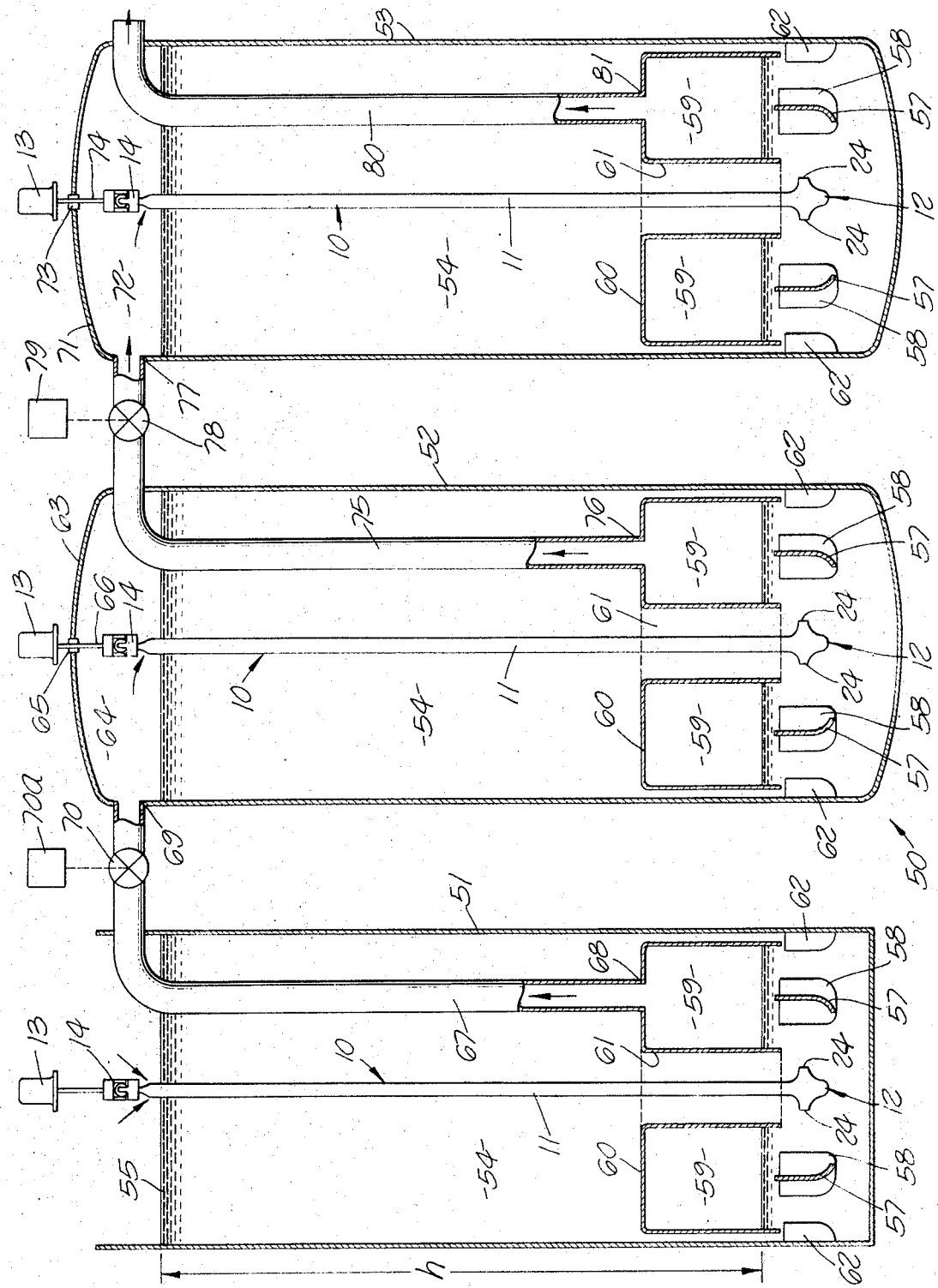
FIG. 6 is a side view illustrating the mixing and dispersing apparatus in a compressor system.

Besides moving the fluid 15 the blades 21 during rotation act to disintegrate solids in the first fluid 15 which contact the impeller section 12. Furthermore, the design of the impeller section 12 is such that it is non-clogging when the first fluid 15 contains solids and the design of the blades 21 and the surfaces of revolution 17 and 18 are such that the directional transition of the fluid 15 is smooth and the acceleration of the fluid 15 along the surfaces of revolution 17 and 18 is uniform thereby providing an apparatus which is efficient in operation. Moreover, while the device 10 is particularly effective in the mixing and dispersing of air with polluted water substantially below the surface of the water, the device can also be for various other purposes. The device 10 may be used as an evaporative cooler when there is relatively shallow submergence of the impeller section 12 and in a compressor unit when the impeller section 12 is deeply submerged in a fluid having relatively heavy specific gravity with respect to the gas being compressed. Use of the device 10 in a compressor unit is shown in FIG. 6.

The compressor unit, generally designated 50, includes a plurality of three tanks 51, 52 and 53 containing a liquid 54. Tank 51 is open to the atmosphere at the top and the shaft 11 of the device 10 is extended below the surface 55 of the liquid 54. The motor 13 and the openings for communication of air into the hollow shaft 11 are located above the surface 55. The depth which the impeller section 12 is submerged depends on the static head "$h$" necessary to compress the gas or air being dispersed into the fluid 54.

Adjacent the circumferential opening 24 of the impeller section 12 is an air directing member 57 and baffles 58. The air directing member 57 is generally cylindrical with the walls extending vertically. The air directing member 57 is adapted to direct the air bubbles which are mixed into the liquid 54 by the device 10 up into a chamber 59 of an inverted container 60 which includes a central cylindrical opening 61 which surrounds the shaft 11. The baffles 58 are generally flat plates which extend radially with respect to the axis of the shaft 11. Additional baffles 62 are secured to the walls of the tanks 51, 52 and 53 below the containers 60 and also extend radially with respect to the axis of the shaft. The baffles 58 and 62 are adapted to break up the circumferential flow of the liquid 54 in the tanks 51, 52 and 53 during rotation of the impeller sections 12.

Tank 52 is enclosed at its upper end by a cover 63. The cover 63 and the walls of the tank 52 define a pressure chamber 64. The motor 13 is located outside the pressure chamber 64 and above the cover 63. Seal means 65 provide an air tight seal between the cover 63 and the shaft 66 which operably connects the motor 13 to the rotatable shaft 11.

A conduit 67 connected at one end 68 to the container 60 in tank 51 and connected at the other end 69 to the tank 52 is adapted to communicate the pressurized air from the chamber 59 in tank 51 to the pressure chamber 64 in tank 52. A valve 70 controls the flow of air into pressure chamber 64 and also prevents the return of any air from the pressure chamber 64 to the chamber 59 in tank 51. Control means 70a controls the opening and closing of the valve 70.

Tank 53 is also enclosed at its upper end by a cover 71 which along with the walls of the tank 53 also defines a pressure chamber 72. Seal means 73 provide an air tight seal between the cover 71 and the shaft 74 operably connecting the motor 13 with shaft 11. A conduit 75 connected at one end 76 to the container 60 in tank 52 and connected at the other end 77 to the tank 53 is adapted to communicate pressurized air from the chamber 59 in tank 52 to the pressure chamber 72 in tank 53. A valve 78 controls the flow of air into pressure chamber 72 and also prevents air from returning to the chamber 59 in the tank 52. Control means 79 controls the opening and closing of the valve 78.

Another conduit 80 connected at one end 81 to the container 60 in the tank 53 is adapted to communicate the pressurized air from the tank 53.

The compressor unit 50 operates by drawing air under atmospheric pressure into and through the hollow shaft to the impeller section 12 which is submerged below the surface 55 of the liquid 54. The air is drawn through the shaft and out through the circumferential opening 24 into the liquid 54 by the rotation of the impeller section 12 which as described above creates a vacuum zone adjacent the opening 24. The air is dispersed in the liquid 54 in the form of bubbles and the bubbles are directed and guided by the air directing member 57 into the chamber 59 in the tank 51. The pressure of the air in the chamber 59 in the tank 51 is dependent on the static head "h" of the liquid which is acting on the air in the chamber 59 in the tank 51. This pressurized air is communicated to the pressure chamber 64 where it is drawn through openings in the upper end of the shaft 11 of the device 10 in the tank 52 through the shaft 11 into the vacuum zone adjacent the opening 24 created by the action of the impeller section 12 in the tank 52. This pressurized air from the chamber 64 is further pressurized by the liquid acting on the air collected in the chamber 59 in the tank 52. The further pressurized air is communicated through the conduit 75 to the pressure chamber 72. The air in the pressure chamber 72 is then dispersed into the fluid 54 in the tank 53 by the device 10 in the tank 53 and is again further pressurized by the liquid 54 acting on the air collected in the chamber 59 in the tank 53. The pressure of this air which is communicated from the tank 53 by the conduit 80 has a pressure which is generally equal to atmospheric pressure plus the static head "h" of all three tanks 51, 52 and 53 times the specific weight of liquid 54. It should be noted that additional tanks and additional mixing and dispersing devices can be provided to further increase the pressure of the air.

The use of this device 10 in a compressor unit provides a compressor unit which is free from oil contamination and which can operate without an aftercooler. Having fully described my invention, it is to be understood that I do not wish to be limited to the details set forth, but my invention is of the full scope of the appended claims.

I claim:

1. An apparatus for mixing and dispersing a first fluid into a second fluid, comprising: a shaft;
   an impeller section on said shaft adapted to be submerged and rotated in a first fluid, said impeller section including first and second external surfaces and an internal chamber within said first and second external surfaces;
   means including a passageway in communication with a second fluid and extending from said second fluid to said internal chamber for communication of said second fluid to said internal chamber;
   said first external surface being curved in cross-section and having a flange portion extending radially from the axis of said shaft;
   a plurality of continuous spiral screw blades encircling said first external surface and terminating on said flange portion, said blades having an outer periphery defining a flaring surface of revolution and adapted to circulate said first fluid along said first external surface and radially outward past said flange portion; and
   said impeller section having an opening between said first and second external surfaces and adjacent to said flange portion, said opening in communication with said internal chamber and adapted to pass said second fluid from said internal chamber into said first fluid.

2. The apparatus of claim 1, wherein said second external surface is curved in cross-section and has a flange portion extending radially from the axis of said shaft and adjacent said opening, a plurality of continuous spiral screw blades encircling said second external surface and terminating on said flange portion, said blades having an outer periphery defining a flaring surface of revolution and adapted to move said first fluid along said second external surface and radially outward past said flange portion.

3. The apparatus of claim 2, wherein a plurality of five spiral screw blades encircle said first external surface and a plurality of five spiral screw blades encircle said second external surface.

4. The apparatus of claim 1, wherein said second external surface has a flange adjacent said opening and said flanges of said first and second external surfaces extend outwardly and downwardly.

5. The apparatus of claim 1, wherein said second external surface has a flange adjacent said opening, and said flanges of said first and second external surfaces are flared.

6. The apparatus of claim 1, wherein said opening extends circumferentially around said impeller section.

7. The apparatus of claim 6, wherein vanes are provided in said internal chamber, said vanes extending radially inward from said circumferential opening to said internal chamber and adapted to direct said second fluid from said internal chamber through said circumferential opening.

8. The apparatus of claim 1, wherein said first external surface is curved in cross-section downwardly and outwardly and said second external surface is curved in cross-section upwardly and outwardly, said second surface having a radially extending flange portion, and a plurality of continuous spiral screw blades encircling said second external surface and having a periphery defining a flaring surface of revolution.

9. The apparatus of claim 8, wherein said blades on said first external surface downwardly encircle said first external surface in the same direction in which said blades upwardly encircle said second external surface.

10. An apparatus for mixing and dispersing a first fluid into a second fluid, comprising: a shaft;
    an impeller section on said shaft adapted to be submerged and rotated in a first fluid, said impeller section including first and second external surfaces and an internal chamber within said first and second external surfaces;
    means including a passageway in communication with a second fluid and extending from said second fluid to said internal chamber for communication of said second fluid to said internal chamber;
    said first and second external surfaces each being curved in cross-section and each having a flange portion extending radially from the axis of said shaft;
    a plurality of continuous spiral screw blades encircling said first and second external surfaces and extending from a section on said surfaces substantially in axial alignment with said shaft toward said flange portions, said blades smoothly transforming the movement of direction of said first fluid from an axial direction substantially to a radial direction past said flange portions during rotation of said impeller section;

and said impeller section having a circumferential opening positioned between said first and second external surfaces adjacent to said flange portions, said opening in communication with said internal chamber and adapted to pass said second fluid from said internal chamber into said first fluid.

11. The apparatus of claim 10 wherein vanes are provided in said internal chamber, said vanes extending radially inward from said circumferential opening to said internal chamber.

12. The apparatus of claim 10 wherein said spiral screw blades encircling said external surfaces are inclined with respect to the axis of said shaft as they extend toward said flange portions.

* * * * *